(12) United States Patent
Brunt

(10) Patent No.: US 10,295,888 B2
(45) Date of Patent: May 21, 2019

(54) 360 VIDEO/PHOTO PRODUCTION LIGHT APPARATUS

(71) Applicant: Thomas Edward Brunt, Doylestown, PA (US)

(72) Inventor: Thomas Edward Brunt, Doylestown, PA (US)

( * ) Notice: Subject to any disclaimer, the term of this patent is extended or adjusted under 35 U.S.C. 154(b) by 43 days.

(21) Appl. No.: 15/636,089

(22) Filed: Jun. 28, 2017

(65) Prior Publication Data

US 2018/0024417 A1    Jan. 25, 2018

Related U.S. Application Data

(60) Provisional application No. 62/363,873, filed on Jul. 19, 2016.

(51) Int. Cl.
| | |
|---|---|
| *F21K 5/06* | (2006.01) |
| *G03B 15/03* | (2006.01) |
| *G03B 17/56* | (2006.01) |
| *H04N 5/225* | (2006.01) |

(52) U.S. Cl.
CPC ......... *G03B 15/0442* (2013.01); *G03B 15/03* (2013.01); *G03B 17/561* (2013.01); *H04N 5/2256* (2013.01)

(58) Field of Classification Search
CPC ...... G03B 15/02; G03B 15/03; G03B 17/561; G03B 17/568; G03B 15/0442; G03B 15/05; G03B 15/041; H04N 5/2256
USPC .......................... 348/370, 371, 36; 362/8, 11
See application file for complete search history.

(56) References Cited

U.S. PATENT DOCUMENTS

| | | | | |
|---|---|---|---|---|
| 7,570,437 | B2* | 8/2009 | Gal ........................ | G02B 13/06 359/648 |
| 7,742,070 | B2* | 6/2010 | Glatt ..................... | G03B 37/00 348/36 |
| 2003/0142402 | A1* | 7/2003 | Carbo, Jr. .......... | H04N 5/23238 359/509 |
| 2005/0041094 | A1* | 2/2005 | Gal ........................ | G02B 13/06 348/36 |
| 2006/0152819 | A1* | 7/2006 | Gal ........................ | G02B 13/06 359/725 |
| 2017/0347027 | A1* | 11/2017 | Fudge ................... | G03B 17/38 |
| 2018/0101088 | A1* | 4/2018 | Robinson ........... | G03B 21/2033 |
| 2018/0136544 | A1* | 5/2018 | Mink .................... | G03B 15/05 |

FOREIGN PATENT DOCUMENTS

| | | | | |
|---|---|---|---|---|
| DE | 102006042022 | A1 * | 3/2008 | ............ G03B 37/00 |
| EP | 2568330 | A2 * | 3/2013 | ............ G03B 15/05 |
| JP | 2009186943 | A * | 8/2009 | |
| JP | 2017068160 | A * | 4/2017 | |

* cited by examiner

*Primary Examiner* — John Villecco

(57) ABSTRACT

A lighting apparatus designed for the 360 degree videography/photography/virtual reality market, comprising an annular light emitter which distributes even light in a 360 degree pattern supporting all camera viewpoints yet avoids lens flares and is invisible to the camera lenses by way of a disk shielding the camera from the annular light emitter. The slope of the annular light emitter allows light to distribute upwards, downwards and outward while masking light from the camera lenses. The apparatus is capable of supplying continuous light or may be used as a photo flash.

15 Claims, 9 Drawing Sheets

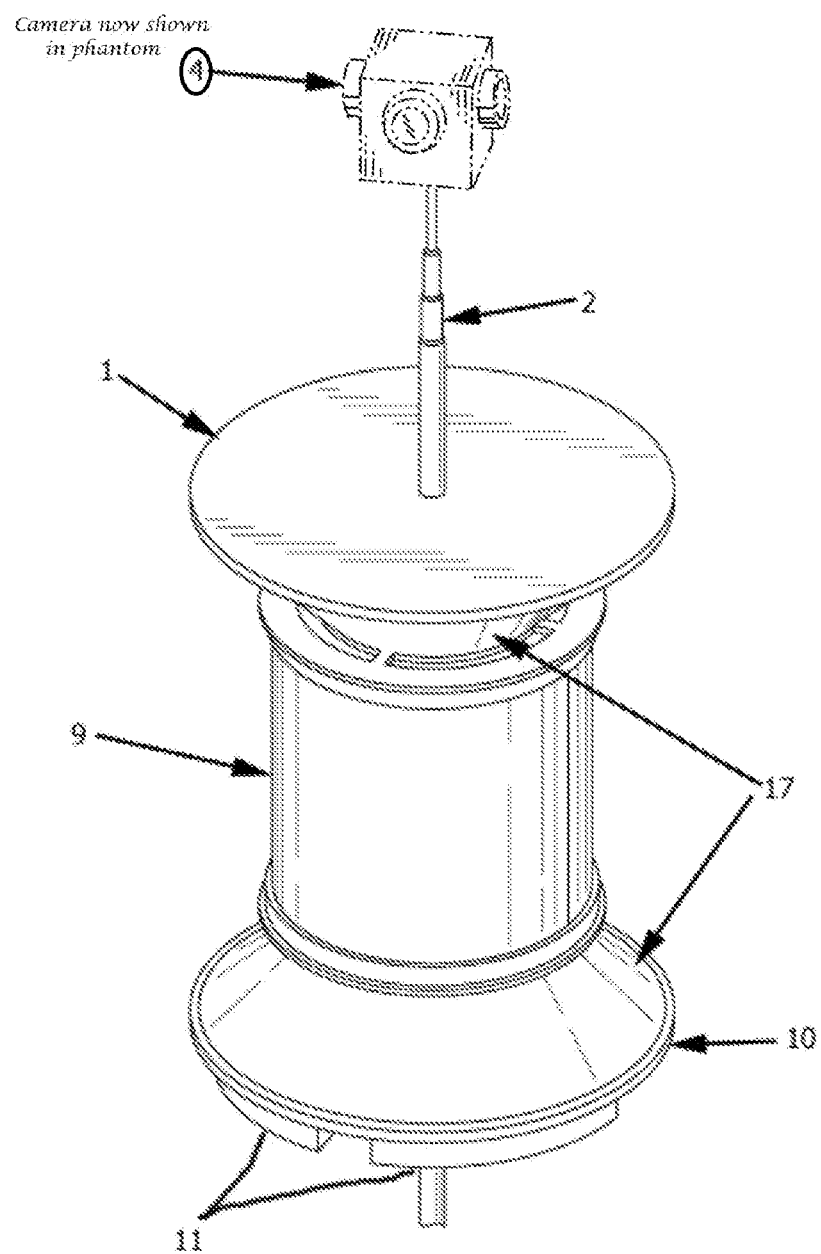

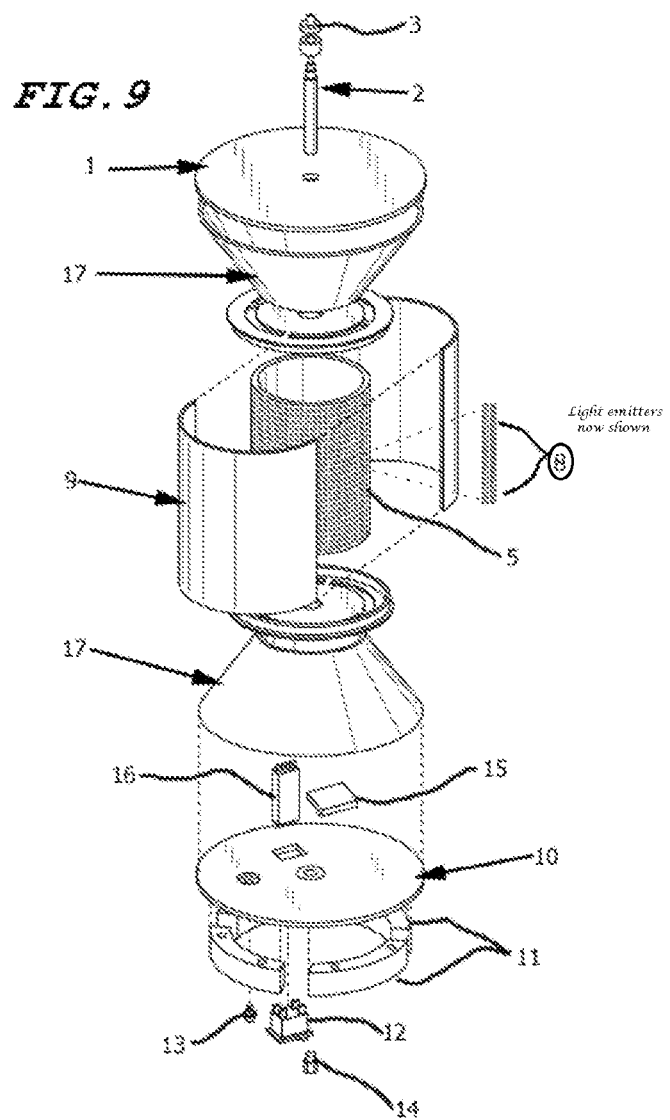

360 VIDEO/PHOTO PRODUCTION LIGHT APPARATUS

PRIORITY CLAIM

This non provisional application claims priority from provisional patent application 62/363,873 titled 360 VIDEO/PHOTO PRODUCTION LIGHT APPARATUS filed Jul. 19, 2016, the text and drawings of which are incorporated into this application as though fully set forth herein.

BACKGROUND

The disclosed subject matter relates to the field of lighting for the 360/VR video/photography production market; professional and consumer. Also has application in general room lighting and general photography lighting.

Typical to 360 video/photo production, a 360 degree camera can see in all directions. The viewer of 360 content can look around all angles and viewpoints. It is a camera that sees everything in view, and has no blind spots in which one would typically consider "behind the scene." The current production techniques to light scenes for 360 video is to use existing ambient lighting, hide or camouflage lights from camera view, or simply allow production lights to be visible in the scene. The problem with lighting for 360 cameras is that they see everything in a scene. You cannot place any production instruments (lighting, etc) in a way that they will not be seen by the camera, without great effort to "hide" them. Seeing the lighting instruments distracts from the scene, and can cause issues such as lens flare and blooming.

There is a need for an improved lighting instrument that adequately lights the scene without being seen by the camera or causing lens flare or blooming issues as summarized, discussed in detail, and claimed in the following text and accompanying illustrations.

SUMMARY

My invention solves the problem of providing adequate lighting for 360 video/photo productions by placing a 360 degree lighting instrument on the tripod, mounted below the camera. The instrument spreads diffused light in all directions outward below where the camera is mounted but not upward into the camera main field of view. The only thing the camera sees is a dark disk below it—which is also where the tripod mounts to it. In this way it provides even lighting without the camera seeing the lighting instrument.

A 360 camera has a field of view that encompasses the mount and tripod being visible, which is considered an unusable part of the image. Many cameras even forgo showing this bottom viewpoint from the viewer. My invention takes advantage of this characteristic of 360 production to put the visible part of the lighting instrument in a view already unusable in the scene.

The light is "virtually invisible" to the 360 camera. The only thing seen is a disk below the camera. This area is also where the tripod and mount would be seen anyway, and is generally covered up in editing by masking it with a logo, or digitally painting it out. The top of the light ideally comprises of a matte black surface in the shape of a disk, providing for a neutral unobtrusive object in what is considered the unusable space of the 360 image, which many cameras don't even provide a view of. Alternatively the disk could be used to display branding or other images or text as desired.

Significant advantages of this invention include: fast setup, for quick video shoots at various locations; provides even lighting for the entire scene without resorting to hiding lights so they are not visible to the camera; battery powered, and portable, scalable design to work with many sized cameras.

The following detailed description includes references to the accompanying illustrations which form a part of this detailed description. Example embodiments are described in enough detail to enable those skilled in the art to practice the present subject matter. However, it will be apparent to one of ordinary skill in the art that the present invention may be practiced without some of these specific details. In other instances, well-known methods, procedures and components have not been described in detail so as not to unnecessarily obscure aspects of the embodiments. The embodiments can be combined, other embodiments can be utilized, or structural and method of use changes can be made without departing from the scope of what is defined and claimed. The following detailed description is, therefore, not to be taken as a limiting sense, and the scope is defined by the appended claims and their equivalents which are to be understood in their broadest possible sense.

In some embodiments, the instrument may be configured to include a flash actuator as known in the art enabling the instrument to act as a flash for still photography rather than as a continuous light source.

BRIEF DESCRIPTION OF THE DRAWINGS

Embodiments of the described apparatus are illustrated by way of example in the figures of the accompanying drawing sheets, in which like references indicate similar elements and in which:

FIG. 8 is a top perspective view of a 360 Video/Photo Production Light according to alternate embodiment using reflectors;

FIG. 9 is an exploded view of a 360 Video/Photo Production Light according to alternate embodiment using reflectors;

DETAILED DESCRIPTION

Figure 1:
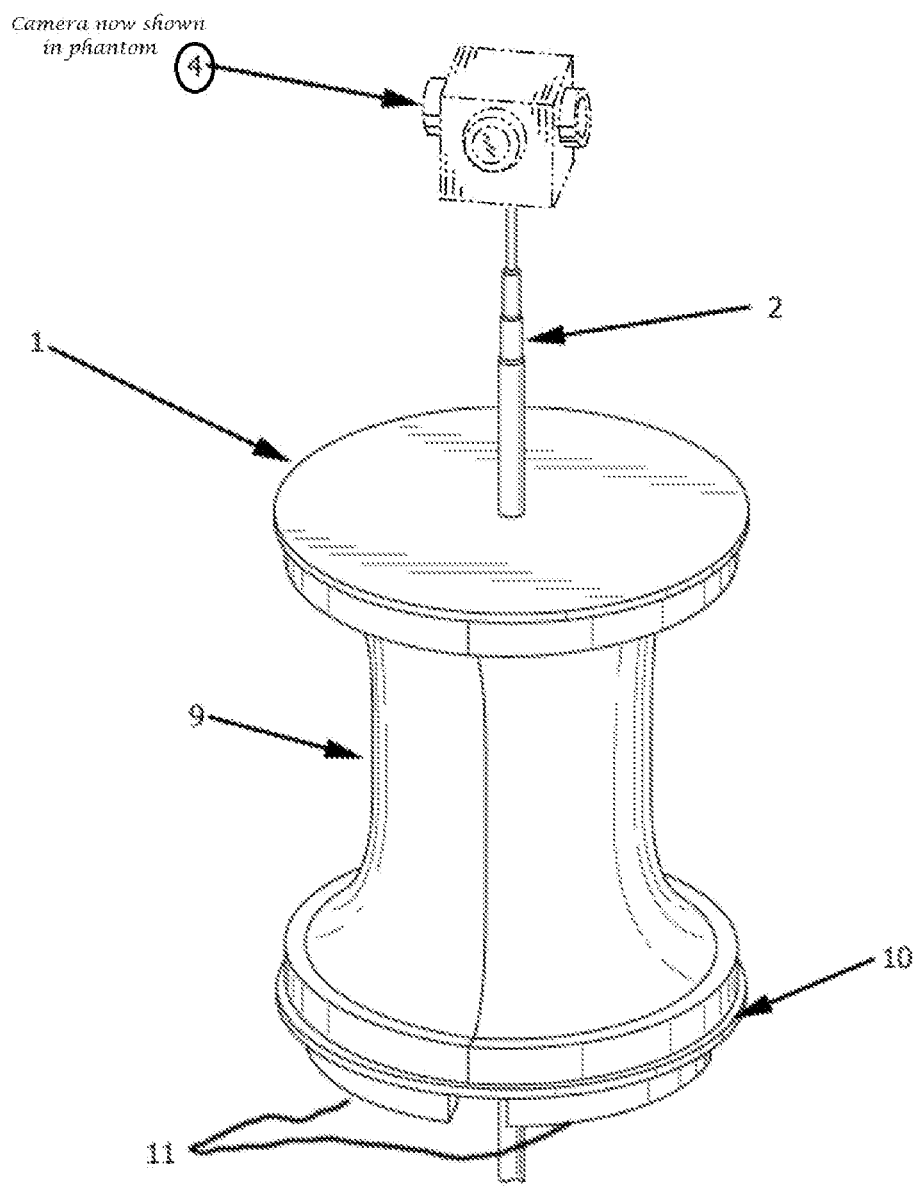
FIG. 1 is a top front perspective view of a 360 Video/Photo Production Light according to preferred embodiment, showing the translucent cover over the light emitter(s).
Figure 2:
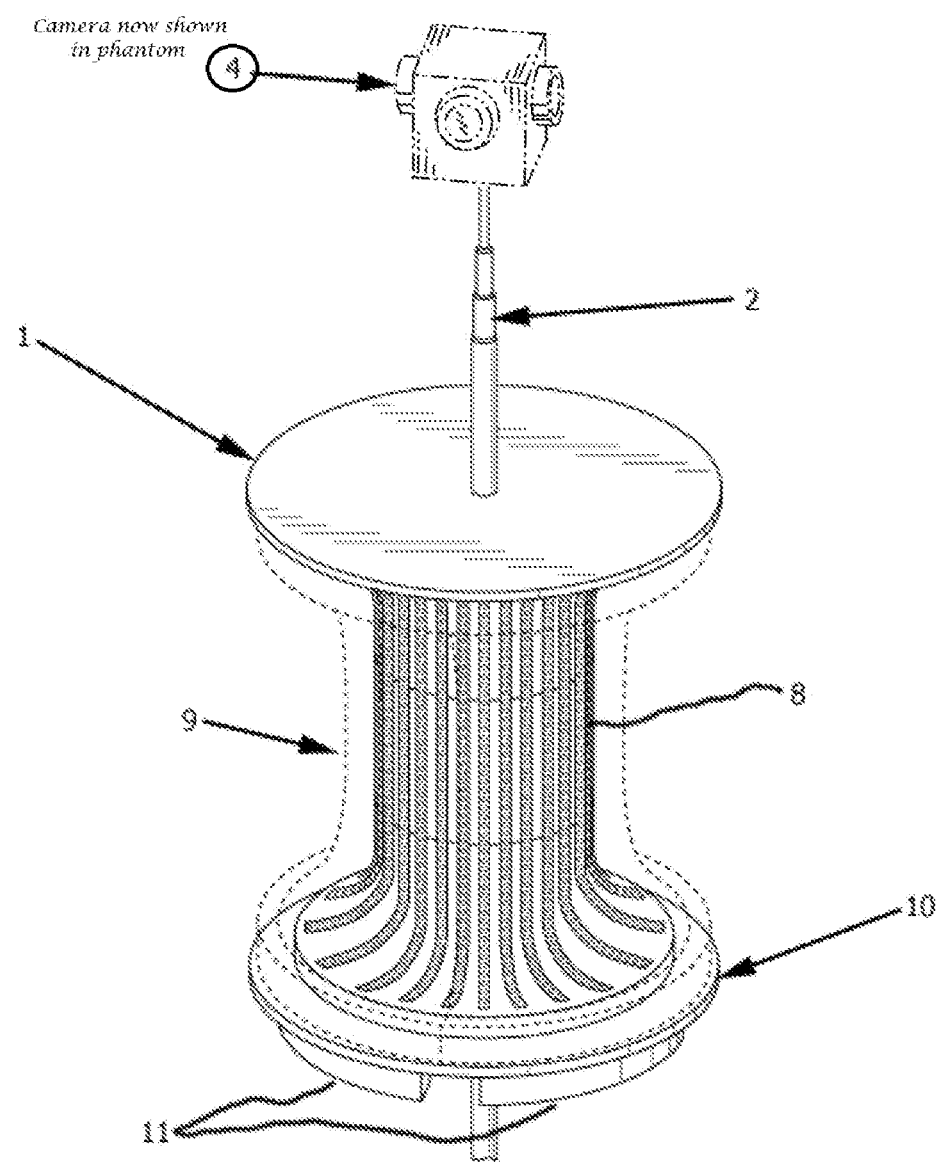
FIG. 2 is a top front perspective view of a 360 Video/Photo Production Light according to preferred embodiment, with translucent cover removed to show detail of the light emitter(s).

In particular, one embodiment of the invention may have a 360 degree lighting unit configured to attach to a camera tripod such that the light shines outward in all directions. A 360 degree lighting unit may include multiple light emitters placed around an axis that is centered around the axis of the tripod, to form an annular light emitter.

In a preferred embodiment, the light emitters flare outward from the center at top and bottom. In this embodiment, it has the effect of producing light that also shines upward from the bottom, and downward from the top to illuminate those parts of the scene without compromising the light shielding abilities of the crown.

In a different embodiment, a ramped reflector may be used above and below the center body causing the light to have a gentle dispersion (falloff). The reflector may be white or a light reflecting surface.

In this context, ramped means sloped away from the light emitters forming a convex angle relative to the tripod axis.

For the base of the apparatus, a preferred embodiment is to house the power source such as a battery, removeable or fixed. It may also house the Power (On/Off) switch and wiring required to connect the switch and battery to the light emitters.

Another embodiment could be to include an adjustable dimmer for the light emitters, which could also be housed inside the bottom reflector, and accessible from the bottom of the apparatus, or by wireless via a remote control or tablet/phone device control.

Another embodiment could be to include an AC power connection for the light to be powered on household current should the user require more operation time than the battery will give.

A preferred embodiment would be the inclusion of multiple posts (legs) extending down below the base past the protrusion of the battery, switch etc. in order to allow the apparatus to stand on its own on the ground, table or other horizontal flat surface. These posts may be needed due to the battery, switch and other electrical connections protruding from the bottom of the base.

Another embodiment could include a power source for the camera itself by way of a standard micro USB connector, or other power connector as known in the art. This could possibly utilize power from the light battery, or be a pass thru to a standard power connector such as a USB connector at bottom of base to allow an external camera power source to be connected underneath the base, where it will be out of view of the camera lenses.

The main light body can be constructed with plastic. The light source itself can be 12 VDC LED lights on a strip that may cover the entire surface of the center cylinder as well as the top and bottom flares. Covering the LED strips will be a light diffusion, translucent material.

The crown facing the top of the apparatus will ideally be matte black.

The base of the apparatus may be of plastic housing the power switch, tripod mount thread, and battery mount.

Protruding top center may be a short telescoping pole with a standard ¼" tripod mount at the top. This facilitates the mounting of the camera. Alternatively any other camera mounting devices known in the art may be used provided they are centered at the top of the crown.

FIG. 1, 2, 4, 8 show the crown 1. This will ideally be matte black since it will be the only part of the apparatus "seen" by the camera, and should be as non-obtrusive as possible.

FIG. 1, 2, 6, 7, 9 shows the camera mount 2 according to a preferred embodiment. This ideally comprises of a 2-or-3 section telescoping tube with a standard ¼" male tripod thread 3 at the top. This allows the camera distance to the apparatus to be adjusted as per the user's preference. A greater distance between the apparatus and the camera will minimize the amount of the apparatus black disk that is visible to the camera.

FIG. 1, 2, 6 shows a typical 360 camera 4 mounted on the apparatus, for illustrative purposes and shown in phantom.

FIG. 1, 6, 7, 8, 9 shows the main body 5 of the apparatus. This houses the light emitters. In the preferred embodiment, they consist of strips of 12v DC LED's wrapped horizontally around a central cylinder, or vertically up and down the cylinder or in any other way such that substantially the entire surface of the cylinder is covered with LED lights.

FIG. 1, 7 shows the flared body 6, 7 of the preferred embodiment of the apparatus. The flared body slopes the light emitters 8 down from the top, and up from the bottom, allowing for them to provide additional light in those directions without compromising the light shielding abilities of the crown. The flared body is shown as a top flare 6, a middle section 5 and a bottom flare 7 but could be manufactured as a single piece along with the main body.

FIG. 1, 2, 6, 7, 8, 9 shows a translucent cover 9 that is positioned in front of the light emitters 8. The translucent cover surrounds the annular light emitter. The purpose of this is two fold. First, it diffuses the light emanating from the apparatus to make it less harsh for persons with a direct view of the light emitters. Second, the diffusion will serve to eliminate the reflection and cast of the individual LED lights in reflective surfaces of the scene, like windows, eyeglasses, elements of the camera lens, etc. which would otherwise be undesirable.

FIG. 1, 2, 3, 7 shows a preferred embodiment for the base 10.

FIG. 1, 2, 3, 5, 7, 8, 9 is a preferred embodiment showing extensions 11 molded into the lower base to provide clearance for the protrusions of the battery, power switch and other components attached to the bottom of the base (i.e. legs). This would permit the apparatus to stand on its own on any flat surface to be used without attaching to a camera tripod.

Figure 3:
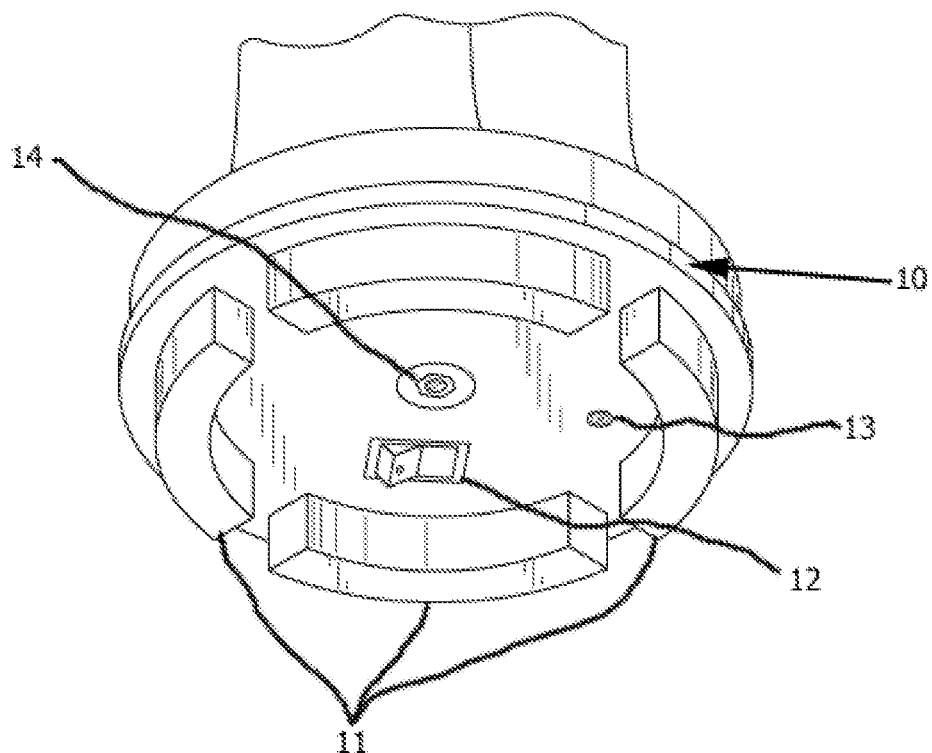
FIG. 3 is a bottom perspective view of a 360 Video/Photo Production Light according to preferred embodiment with the body cutaway for convenience in illustration.
Figure 4:
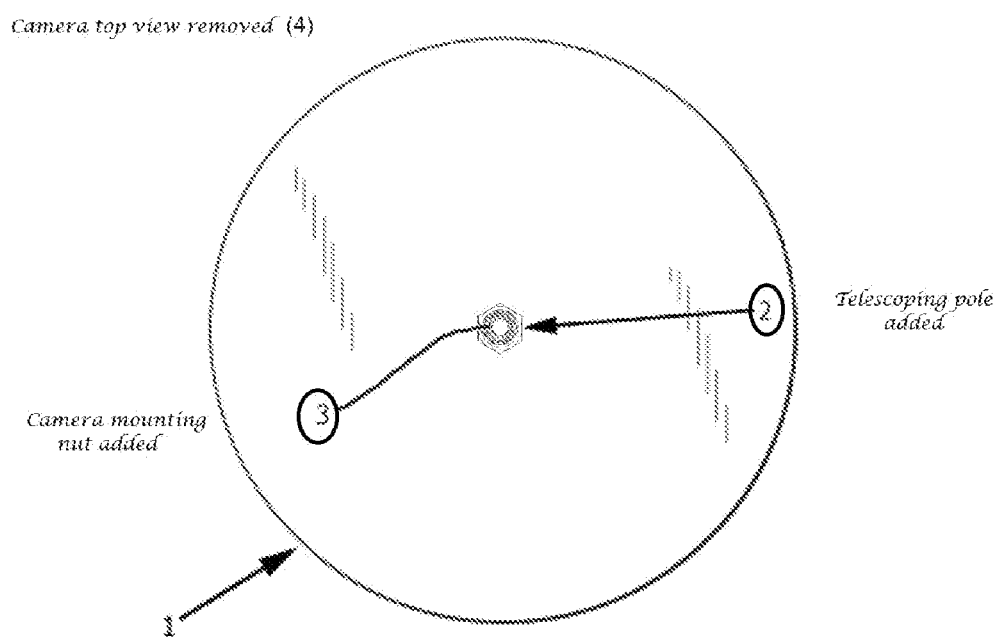
FIG. 4 is a top plan view of a 360 Video/Photo Production Light according to preferred embodiment.
Figure 5:
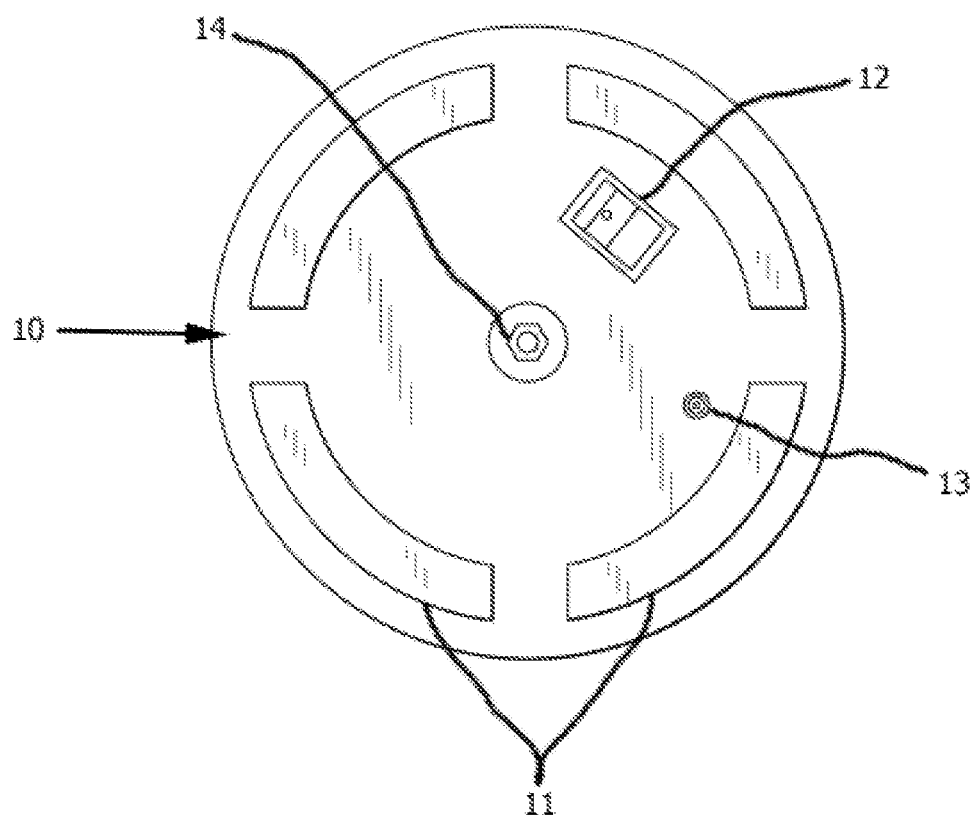
FIG. 5 is a bottom elevation view of a 360 Video/Photo Production Light according to preferred embodiment.
Figure 6:
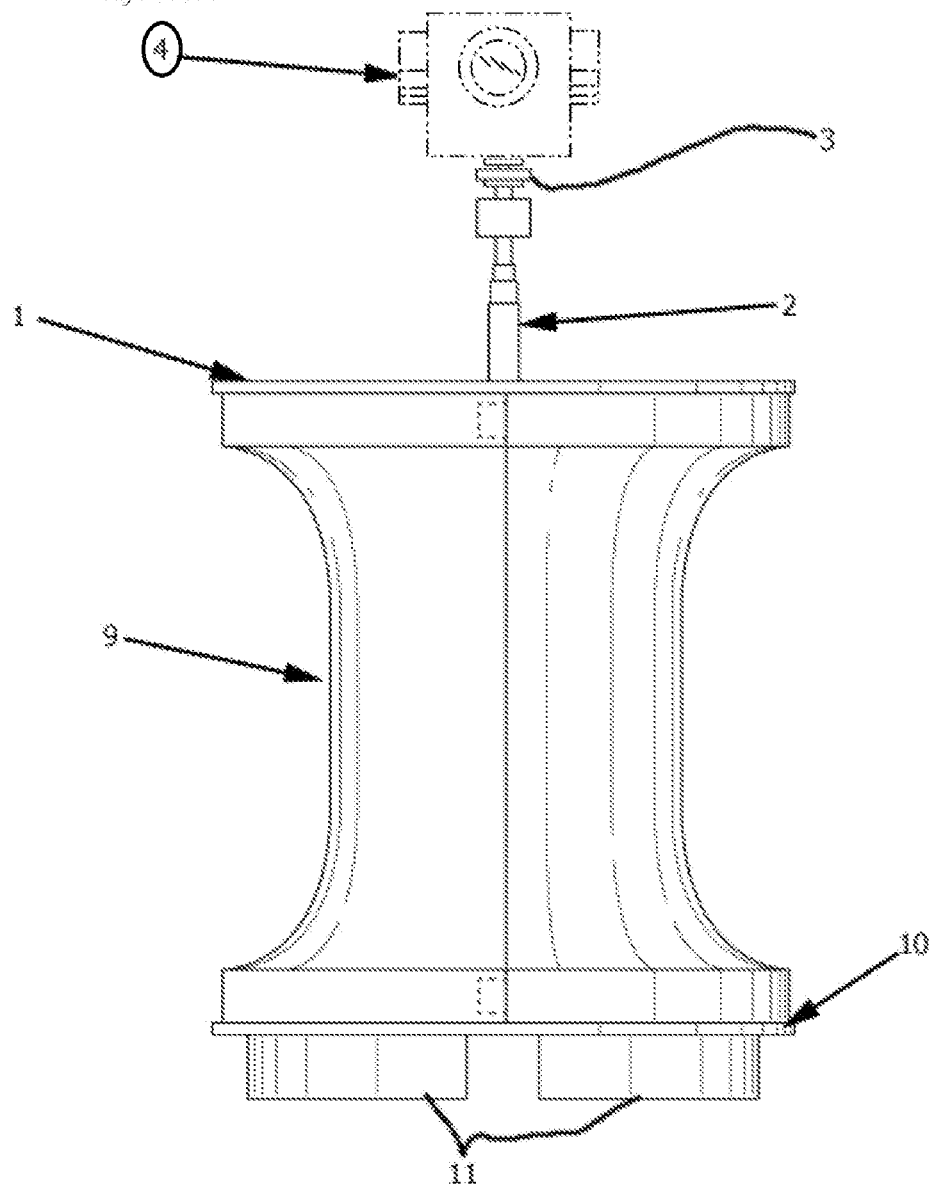
FIG. 6 is a front elevation view of a 360 Video/Photo Production Light according to preferred embodiment.

FIG. 3, 5, 7, 9 shows the preferred embodiment with a power (On/Off) switch 12 to control power feeding from the battery to the light emitters 8.

FIG. 3, 5, 7, 9 shows a preferred embodiment with a power connector 13 to provide DC from a separate AC-DC converter if desired from the user.

FIG. 3, 5, 7, 9 shows a preferred embodiment with a female ¼" tripod thread 14 at the bottom center of the apparatus. This is where it can be mounted to a standard camera tripod.

Figure 7:
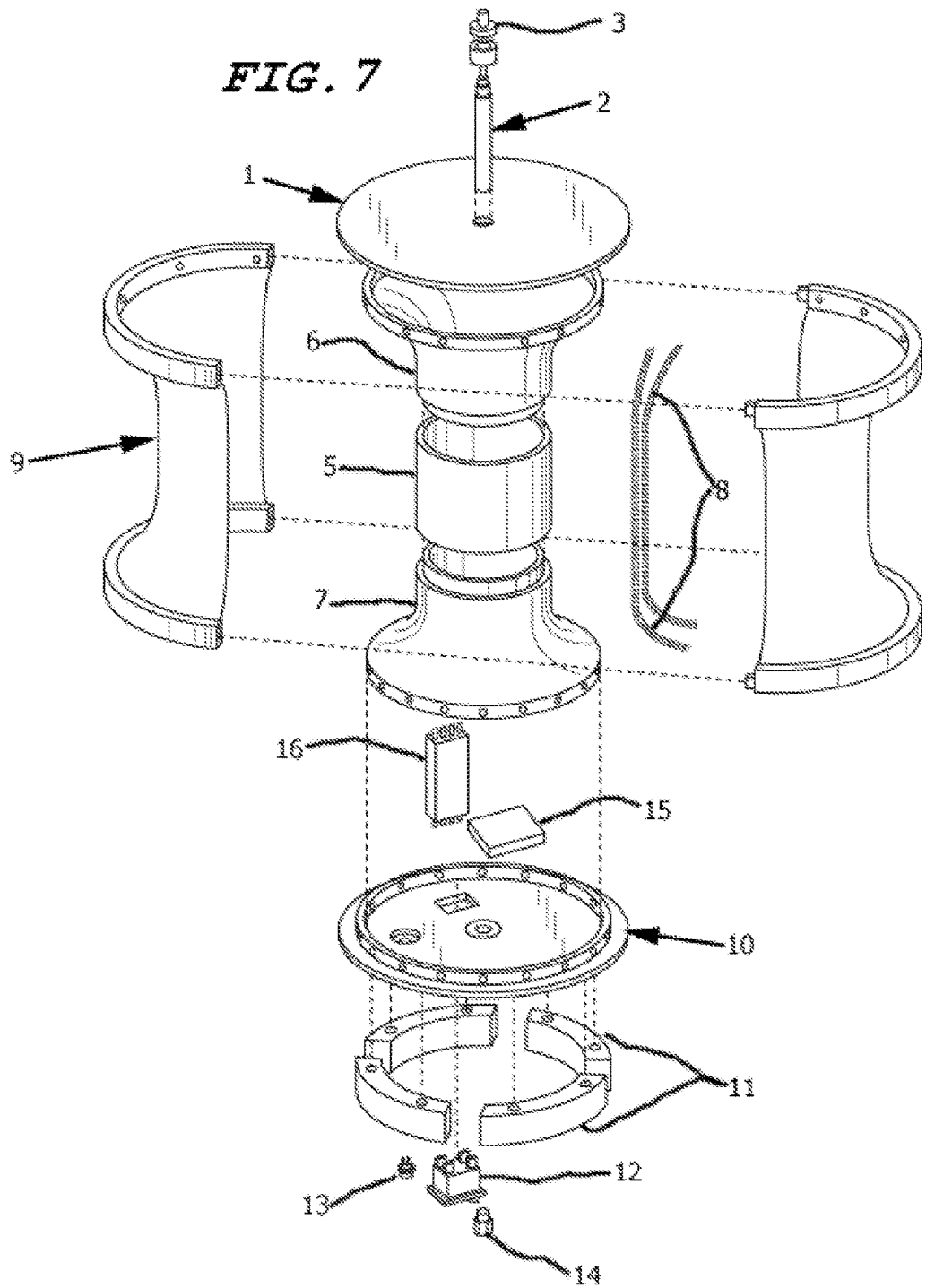
FIG. 7 is an exploded view of a 360 Video/Photo Production Light according to preferred embodiments

FIG. 7, 9 is an embodiment showing a small rechargeable DC battery 15 used as the preferred power source for the light emitters 8.

FIG. 7, 9 is an embodiment showing a controller circuit box 16, mounted internally, which controls the light emitters 8 for brightness, color temperature, etc. either via smartphone or a separate remote control device.

FIG. 8, 9 shows an alternate embodiment of the apparatus, using reflectors 17 to direct light from the emitter(s) downward and upward without compromising the light shielding abilities of the crown.

What is claimed is:

1. A lighting instrument and camera mount for 360 degree photography/videography comprising:

a cylindrical body having a plurality of light emitters wherein the body is capable of producing light around its circumference; and a top having a camera-facing side and a body-facing side wherein said camera-facing side is configured to mount a camera; and wherein said top has a camera mount protruding from said camera-facing side at the center of said top; and wherein said body-facing side is configured to block light emitted from said light emitters so that they are not visible to the camera; and a base;

wherein said top has a first diameter, the center of said body has a second diameter and said base has a third diameter.

2. The lighting instrument of claim 1 wherein said first diameter and said third diameter are greater than said second diameter and wherein said body has a top flare and bottom flare.

3. The lighting instrument of claim 2 wherein said top flare has at least one light emitter of said plurality of light emitters configured to direct light downward and said bottom flare has at least one light emitter of said plurality of light emitters configured to direct light upward.

4. The lighting instrument of claim 2 wherein said top flare has a reflective surface configured to direct light from said plurality of light emitters downward and said bottom flare has a reflective surface configured to direct light from said plurality of light emitters upward.

5. The lighting instrument of claim 2 wherein said top flare and said bottom flare are integral to said body.

6. The lighting instrument of claim 2 wherein said top flare and said bottom flare are removeably attached to said body.

7. The lighting instrument of claim 1 wherein said plurality of light emitters are semiconductor light elements.

8. The lighting instrument of claim 1 wherein said base is configured for sitting said lighting instrument on a flat surface.

9. The lighting instrument of claim 1 wherein said base is configured for mounting on a camera tripod.

10. The lighting instrument of claim 1 further comprising a translucent cover configured to diffuse emitted light.

11. The lighting instrument of claim 1 wherein said camera mount is a telescoping pole.

12. The lighting instrument of claim 1 wherein said plurality of light emitters are dimmable.

13. The lighting instrument of claim 1 wherein brightness of said plurality of light emitters may be varied by way of a dimming control.

14. The lighting instrument of claim 13 wherein said dimming control is wirelessly accessed.

15. The lighting instrument of claim 1 further comprising a flash actuator.

* * * * *